United States Patent
Dewey

[15] 3,673,455
[45] June 27, 1972

[54] HIGH SPEED SENSOR FOR INITIATING CIRCUIT BREAKER TRIPPING

[72] Inventor: Clyde G. Dewey, Drexel Hill, Pa.
[73] Assignee: General Electric Company
[22] Filed: Nov. 18, 1970
[21] Appl. No.: 90,567

[52] U.S. Cl. .............................317/29 R, 317/26, 317/335 C, 317/27
[51] Int. Cl. ........................................H02h 7/26, H02h 3/08
[58] Field of Search ........................317/26, 29, 33, 27, 18 R; 307/131; 324/87

[56] References Cited

UNITED STATES PATENTS 3,273,017  9/1966  Mathews ..............................317/29 R Primary Examiner—D. F. Duggan
Assistant Examiner—Harvey Fendelman
Attorney—J. Wesley Haubner, William Freedman, Frank L. Neuhauser, Oscar B. Waddell and Joseph B. Forman

[57] ABSTRACT

Discloses a high speed sensor for initiating tripping of a transmission-line circuit breaker in response to the occurrence of a fault on the transmission line. Comprises current-magnitude sensing means and rate-of-change of current sensing means that coact to produce sensor operation when the instantaneous magnitude of the line current and its rate of change for a predetermined duration exceed predetermined levels.

6 Claims, 5 Drawing Figures

PATENTED JUN 27 1972 3,673,455
SHEET 1 OF 2
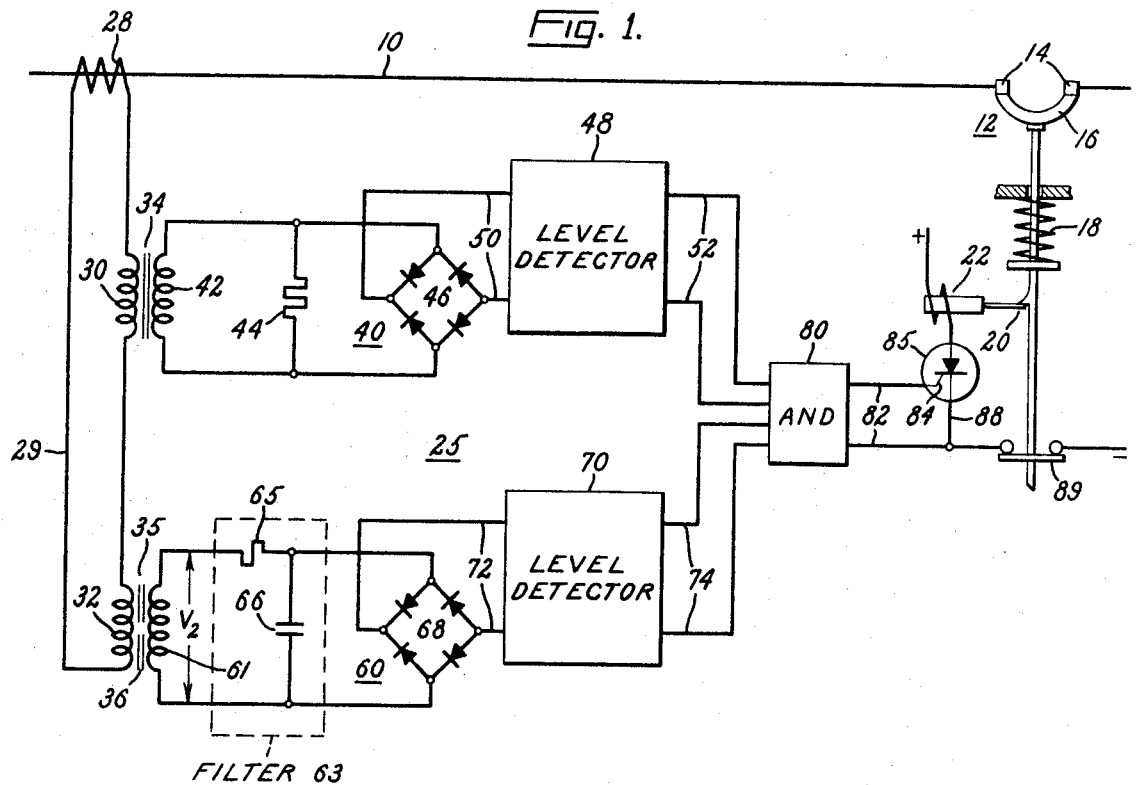
Fig. 1.
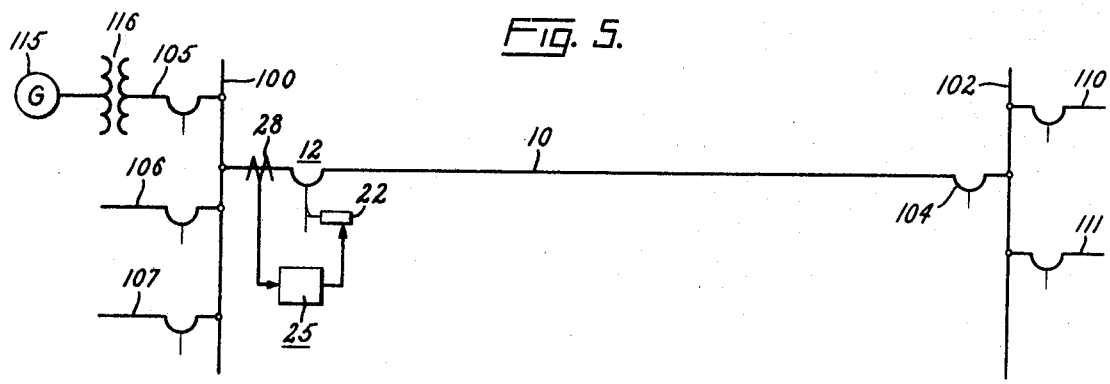
Fig. 5.
Fig. 4.
INVENTOR:
CLYDE G. DEWEY,
BY William Friedman
ATTORNEY

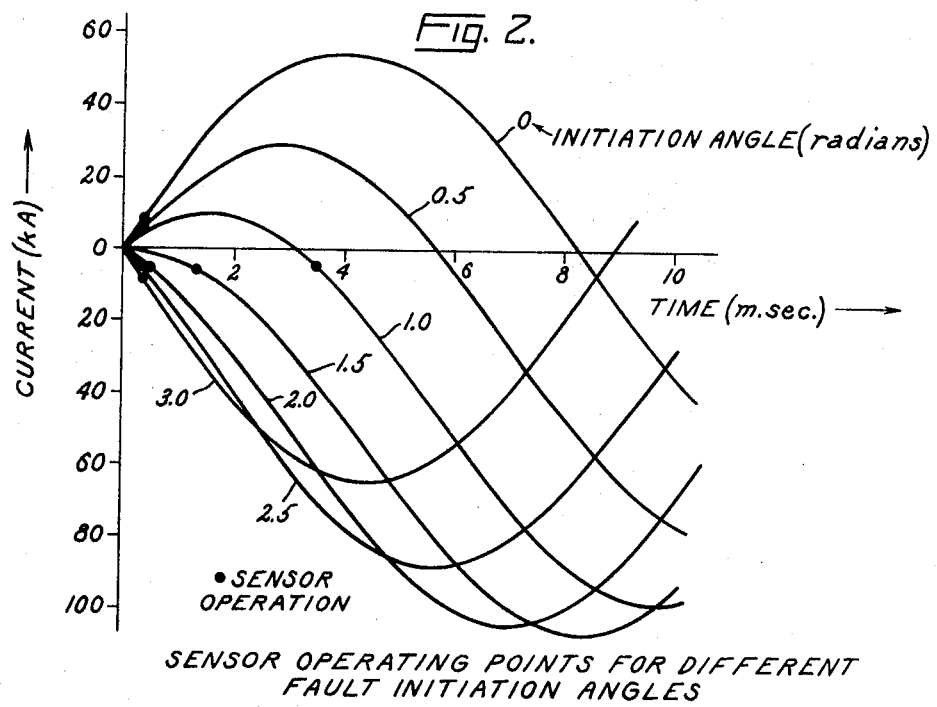
SENSOR OPERATING POINTS FOR DIFFERENT
FAULT INITIATION ANGLES
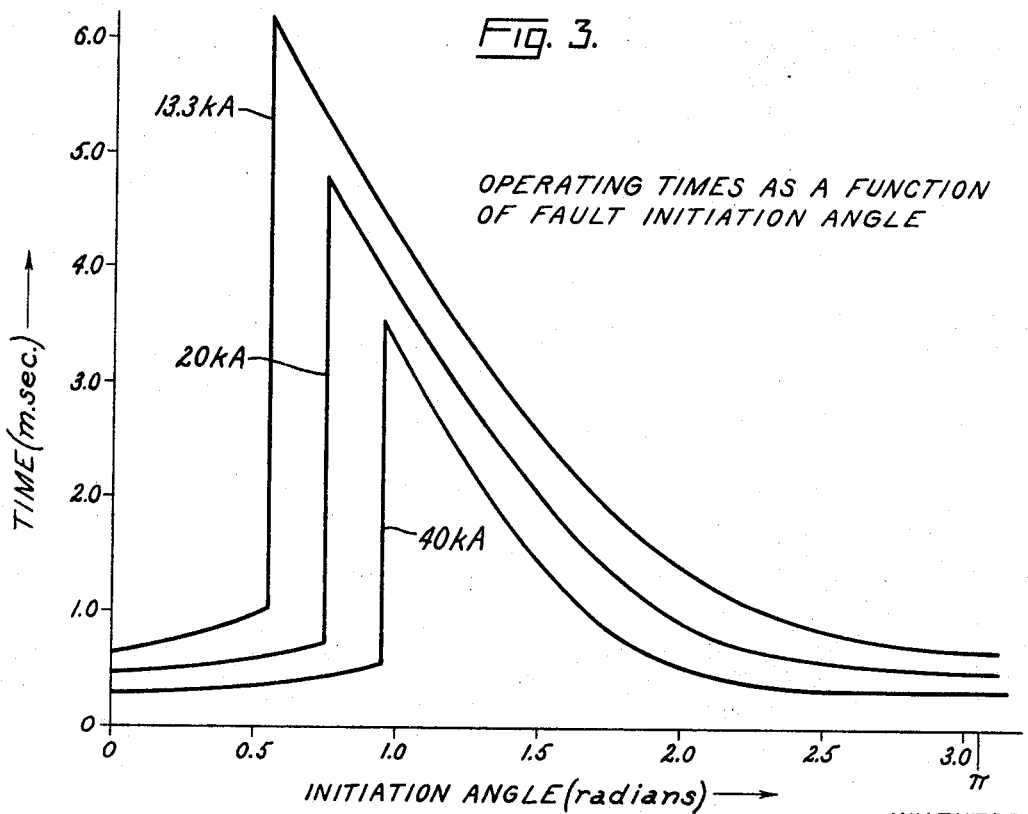

HIGH SPEED SENSOR FOR INITIATING CIRCUIT BREAKER TRIPPING

This invention relates to a high speed sensor for initiating tripping of a transmission-line circuit breaker in response to the occurrence of a fault on the transmission line.

Types of sensors that are typically relied upon for this function are directional relays and directional distance relays. The fastest commercially available relays of these types that I am aware of require about one-half cycle to operate and even more where a pilot channel is used for supplying information to the relay.

An object of my invention is to provide a sensor of a simple and inexpensive design which can operate in response to a fault in much shorter times than that required by conventional directional and distance relays.

A possible way of attaining this objective is to rely upon an overcurrent relay that is responsive solely to current magnitude. Such a relay, however, is subject to the disadvantage that unless it is set to operate at a very low magnitude of current, it tends to be unduly slow under those conditions when the fault current begins with a minor loop. On the other hand, if such a relay is set to operate at very low current magnitudes in order to be responsive to such minor current loops, then it is susceptible to unintended operations, as for example, on major loops of the asymmetrical fault current which results from faults occurring outside the relay's intended operating zone.

Accordingly, another object of my invention is to provide a magnitude-sensitive overcurrent relay which is able to respond to relatively low values of fault current but is able to remain inactive in the event that the fault is located outside the relay's intended operating range, even though the fault current may have a peak value exceeding the normal magnitude-response level of the relay.

In carrying out the invention in one form, I provide a high speed overcurrent sensor for responding to fault conditions in an AC transmission line. This sensor comprises (1) current-magnitude sensing means for developing a first control signal when the instantaneous current through said line, irrespective of its instantaneous direction, exceeds a predetermined magnitude and (2) rate-of-change of current sensing means for developing a second control signal when the rate of change of said line current exceeds a predetermined value for a predetermined duration. The sensor further comprises an AND circuit for receiving said first and second control signals and for developing an output signal in response to the simultaneous receipt of said first and second control signals.

For a better understanding of the invention, reference may be had to the following description taken in conjunction with the accompanying drawings, wherein:

FIG. 1 is a schematic circuit diagram of an overcurrent sensor embodying one form of the invention.

FIG. 2 is a graphical representation of certain operating characteristics of the sensor for different fault initiation angles.

FIG. 3 is another graphical representation of certain operating characteristics of the sensor of FIG. 1.

FIG. 4 is a graphical representation showing the sensor's ability to avoid misoperation under certain low current fault conditions.

FIG. 5 is a one-line diagram of a bulk-power system employing the overcurrent sensor of FIG. 1 for certain relaying functions.

Referring now to FIG. 1, there is shown an alternating current transmission line 10 in which an electric circuit breaker 12 is connected. The illustrated circuit breaker 12 is of a conventional design, and as such, comprises a set of stationary contacts 14, a movable bridging contact 16, and opening spring means 18 biasing the bridging contact from its closed position shown to an open position in which the contacts 14 and 16 are separated. The bridging contact 16 is maintained in its closed position shown by a latch 20 controlled by a tripping solenoid 22. When the coil of solenoid 22 is energized, the solenoid releases latch 20, allowing opening spring 18 to discharge and drive the movable bridging contact 16 into its open position.

For causing the breaker to open in response to a fault on transmission line 10, I provide an overcurrent sensor 25. Sensor 25 comprises a conventional current transformer having a secondary winding 28 inductively coupled to the transmission line 10. Connected across secondary winding 28 is a secondary circuit 29 including the series combination of windings 30 and 32. Winding 30 is the primary winding of an isolating transformer 34. Winding 32 is the primary winding of a transactor 35 having an iron core 36 with an air gap therein, as schematically illustrated. The current through circuit 29 is an analog of the current in transmission line 29 and is substantially proportional thereto.

The current sensor 25 has one portion 40 which is referred to hereinafter as its magnitude-sensing portion and another portion 60 which is referred to hereinafter as its rate-of-change sensing portion.

The isolating transformer 34 is relied upon to supply an input signal to the magnitude-sensing portion of the overcurrent sensor 25. Across the secondary winding 42 of isolating transformer 34 a low ohmic resistor 44 is connected. Across this resistor 44 a voltage is developed which is an analog of the current in transmission line 10. This voltage is rectified by full-wave rectifier 46, and the rectified voltage is supplied to a level detector 48 by means of an input circuit 50. Level detector 48 is of a conventional design, such as for example the Schmitt trigger circuit disclosed on pages 199–200 of the G.E. Transistor Manual, Seventh Edition, 1964, General Electric Company, Syracuse, N.Y. When the instantaneous voltage appearing across the input circuit 50 exceeds a predetermined level, the level detector 48 develops an output signal which appears across its output circuit 52. So long as the instantaneous voltage across input circuit 50 exceeds this predetermined level, an output signal is present across output circuit 52. But when the voltage across input circuit 50 drops below approximately this predetermined level, the output signal disappears. Thus, so long as the instantaneous current in transmission line 10 is above a predetermined magnitude, the level detector 48 develops a control signal across its output circuit 52.

Referring now to the rate-of-change sensing portion 60 of the sensor, the transactor 35 comprises a secondary winding 61 that is coupled to its air-gap-containing iron core 36. Across secondary winding 61 a voltage $V_2$ appears which is proportional to the rate of change of current (di/dt) in the circuit 29 and, hence, in the power circuit 10. A transactor capable of performing in this manner is disclosed in detail in U.S. Pat. No. 2,241,127—Harder. This voltage $V_2$ is applied to a smoothing filter 63 that is preferably of the RC type. In FIG. 1, this filter is shown as comprising a resistor 65 and a capacitor 66 connected in series across the secondary winding 61. The output from the filter is a voltage appearing across capacitor 66. This voltage is rectified by a full wave rectifier 68, and the rectified output from the rectifier is applied to a level detector 70 through an input circuit 72. Level detector 70 is of a conventional design substantially the same as that used for the other level detector 48. When the instantaneous output voltage supplied to the level detector 70 exceeds a predetermined value, a control signal immediately appears across an output circuit 74 of the level detector. This control signal continues so long as the input voltage exceeds the predetermined pickup level of the level detector 70 but disappears when the input voltage drops below approximately this level.

The output circuits 52 and 74 from the two level detectors 48 and 70 serve as input channels to an AND circuit 80 of a conventional design. The AND circuit 80 has an output circuit 82 across which no voltage is normally developed. A signal applied to either input channel 52 or 74 when none is present on the other input channel results in no output signal being developed on output circuit 82. But when input voltages are simultaneously present on input channels 52 and 74, the AND circuit immediately responds by developing an output voltage across its output circuit 82. This output voltage is applied to the gating electrode 84 of a silicon controlled rectifier 85. Controlled rectifier 85 is a normally off device, but it responds to the gate current resulting from this voltage by firing to complete an energizing circuit for the tripping solenoid 22. This energizing circuit extends from positive to negative terminals of a suitable power supply via the series combination of solenoid 22 and the SCR 85. Completion of this energizing circuit 88 causes the solenoid 22 to immediately operate to release latch 20 and trip the circuit breaker 12. A conventional "a" switch 89 in series with solenoid 22 opens in response to tripping of the circuit breaker 12 to interrupt the energizing circuit 88 when the breaker opens.

In a sensor embodying one form of the present invention, I have set the level detector 70 so that it produces an output signal when the rate of change of the current in the transmission line 10 exceeds a value of 5.3 amperes per microsecond, which corresponds to the maximum slope of a 10kA symmetrical, 60 Hz wave. The filter is designed to have a time constant such that it will effectively filter out voltage pulses lasting for shorter than 300 microseconds. The voltage appearing across filter capacitor 66 will be substantially unaffected by such pulses. The level detector 48 is set to pick up at 5kA of instantaneous current in transmission line 10. This is about twice the peak value of a traveling wave initiated when a fault occurs on transmission line 10 or when the line is energized at maximum voltage during a closing operation, assuming a typical surge impedance for the line.

With the above-described settings, the point on the curve where tripping would be initiated for a fault current with a 40kA rms AC component is shown in FIG. 2 for various fault initiation angles (i.e., the instant in the cycle when the fault is initiated). The transmission line plus its connected source are assumed to have an inductive reactance to resistance ratio ($^X$/R) of 30. The point at which the relay operates is marked on each curve. From these curves it will be apparent that the operating times differ for different fault initiation angles. It will also be apparent that sensor operation usually occurs in less than 2 milliseconds, and for the worst case in only about 3½ milliseconds. For lower fault currents than that depicted in FIG. 2, the maximum sensor operating time will be slightly higher, but this is of less importance since longer operating times can be tolerated for lower currents. In FIG. 3, I have plotted operating time against fault initiation angle for a 40kA fault current, for a 20kA fault current, and for a 13.3kA fault current, assuming once again that the level detectors are set as above-described. For any value of fault current intermediate two of those for which curves are plotted, a similarly shaped curve would be present in a position between the two plotted curves.

Referring briefly to FIG. 2, it will be noted that when the initiation angle is zero or 0.5 radian, the rate of change of current and the fault current magnitude both exceed their prescribed pickup levels on the positively rising portion of the first loop of current, thereby producing sensor operation early in this current loop. When the initiation angle is 1.0 radian, the fault current exceeds the 5kA pickup level during the first current loop, but when this occurs, the rate of change has dropped below the prescribed pickup level of 5.3 amperes per microsecond, and hence no sensor operation occurs during this current loop. On the next loop of current, however, when the current rises to the 5kA pickup value, the slope, or rate-of-change of current, is already above 5.3 amperes per microsecond, and relay operation immediately occurs following passage of the current through the 5kA level.

The full-wave rectifier 68 renders the sensor insensitive to whether the slope of the current wave is negative or positive (i.e., the level detector 70 will turn on when the slope either in a positive sense or a negative sense exceeds 5.3 amperes per microsecond). Similarly the full wave rectifier 46 renders the sensor insensitive to whether the current magnitude is either negative or positive.

FIG. 4 is provided to illustrate the relay's ability to remain inactive despite fault currents which exceed its magnitude pickup level but are produced by faults located outside its operating zone. Such a fault might produce current $I_1$ having a peak value on its first loop greater than the 5kA pickup value of the magnitude-sensing portion 60 of the sensor. But no sensor operation would occur during this loop since the rate-of-change of the current $I_1$ is below the pickup level of the rate-of-change sensing portion 60 of the sensor during the period the current exceeds 5kA. The pickup level of the rate-of-change sensing portion of the sensor is set so that for those relatively low currents which result from faults outside the sensor's operating zone, the rate of change of current rarely, if ever, exceeds the sensor's pickup level during the period when the magnitude is above the pickup level of the magnitude sensing portion 40 of the sensor. Because the sensor is insensitive to such currents, I am able to reduce its magnitude pickup level to a sufficiently low value to cause sensor operation in response to most minor loops of severe fault current. If the minor loop of any severe fault current has such a low peak that no operation occurs during the minor loop, operation will occur early in the next loop since the current on this loop rises steeply to a value above its magnitude pick-up level.

It will be apparent that my above-described sensor derives its operating information from the line 10 entirely through a conventional current transformer (28), and this contributes to simplicity and low cost.

In my investigation leading to the present invention, consideration was given to relying upon a relay that responds only to rate-of-change of current. Such a relay, however, would be subject to misoperations resulting from initial wave fronts at the inception of a fault, when di/dt can be very high. I am able to prevent such misoperations in my illustrated relay because my magnitude-sensing portion is set to operate only for magnitudes of current about twice the peak current value of the traveling wave initiated by a fault occurring at maximum voltage, which is the instant when the highest value of traveling wave is normally produced by fault inception.

In the bulk power system depicted in the one-line diagram of FIG. 5, the above described transmission line 10 is shown connected between two buses 100 and 102. The circuit breaker 12 is connected in the line 10 at one end, and a corresponding circuit breaker 104 is connected in the line 10 at its opposite, or remote, end. Additional lines 105, 106, and 107 are shown connected to bus 100, and additional lines 110, and 111 are shown connected to the other bus 102. Each line is shown connected to its bus through a circuit breaker in a conventional manner. At least one of the lines, e.g. 105, is connected to a power source comprising a generator 115 and a transformer 116.

The sensor described hereinabove is represented by the block 25 of FIG. 5, and the current transformer 28 for supplying the sensor is shown coupled to line 10 on the bus 100 side of the circuit breaker 12 immediately adjacent the circuit breaker 12. It is to be understood that for any faults occurring near the bus 102, e.g. on line 110 or 111, the fault current will be sufficiently limited in magnitude by the impedance of line 10 to prevent pick-up of the rate-of-change-sensing portion of the sensor 25, except possibly at the inception of the fault, when the magnitude-sensing portion will not be picked up. Thus, the sensor 25 will not operate in response to such faults, properly leaving the relaying function under such circumstances to other relaying means (not shown), which may be of a conventional form. Similarly, if a fault should occur on the bus 100 side of the circuit breaker 12, any fault current flowing through line 10 from the remote bus 102 will be sufficiently limited by the impedance of line 10 to prevent pick up of the rate-of-change-sensing portion of the sensor 25, except possibly at the inception of the fault, when the magnitude-sensing portion will not be picked up. This allows relaying to be performed by conventional relays (not shown). As explained hereinabove, a primary function of the sensor 25 is to produce extreme high speed tripping of the circuit breaker 12 in response to a fault on transmission line 10 that is located close to the circuit breaker 12 on the bus 102 side thereof. This the sensor does in the manner explained hereinabove.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. A high speed overcurrent sensor for responding to fault conditions in an AC transmission line comprising:
   a. means for deriving from said line an input signal that is an analog of line current,
   b. current magnitude sensing means responsive to said input signal for developing a first control signal when the instantaneous value of said line current, irrespective of its instantaneous direction, exceeds a predetermined value,
   c. rate-of-change sensing means responsive to said input signal for developing a second control signal when the rate-of-change of said line current exceeds a predetermined value for a predetermined duration,
   d. and an AND circuit responsive to said first and second control signals for developing an output signal in response to the simultaneous presence of said first and second control signals.

2. The overcurrent sensor of claim 1 in which said rate-of-change sensing means includes a filter that renders said rate-of-change sensing means unresponsive to high rates of change in the line current that prevail for periods shorter than said predetermined duration.

3. A high speed overcurrent sensor for responding to fault conditions in an AC transmission line comprising:
   a. current magnitude sensing means for developing a first control signal when the instantaneous line current, irrespective of its instantaneous direction, through said line exceeds a predetermined magnitude,
   b. rate-of-change of current sensing means for developing a second control signal when the rate of change of said line current exceeds a predetermined value for a predetermined duration,
   c. and an AND circuit for receiving said first and second control signals and for developing an output signal in response to the simultaneous reception of said first and second control signals.

4. A high speed overcurrent sensor as defined in claim 1 in which the predetermined value of line current that causes said current-magnitude sensing means to operate is greater than the peak current value of traveling waves initiated by a fault occurring at peak normal voltage on said transmission line.

5. The overcurrent sensor of claim 1 in which:
   a. said first control signal effectively ceases when the instantaneous value of said line current falls below approximately said predetermined value of line current, and
   b. said second control signal effectively ceases when said rate of change of said line current falls below approximately said predetermined value of rate of change.

6. The overcurrent sensor of claim 3 in which:
   a. said first control signal effectively ceases when the instantaneous value of said line current falls below approximately said predetermined value of line current, and
   b. said second control signal effectively ceases when said rate of change of said line current falls below approximately said predetermined value of rate of change.

* * * * *